(12) United States Patent
Gandhi

(10) Patent No.: US 7,729,828 B2
(45) Date of Patent: Jun. 1, 2010

(54) SEAT ASSEMBLIES FOR VEHICLES

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/185,942

(22) Filed: Aug. 5, 2008

(65) Prior Publication Data

US 2010/0036567 A1 Feb. 11, 2010

(51) Int. Cl.
*G06F 7/00* (2006.01)
(52) U.S. Cl. ...................................... 701/36
(58) Field of Classification Search ............... 701/36, 701/45, 49; 180/268–271, 273–274
See application file for complete search history.

(56) References Cited

U.S. PATENT DOCUMENTS

| | | | |
|---|---|---|---|
| 6,591,188 B1 * | 7/2003 | Ohler | ................... 701/209 |
| 6,809,462 B2 | 10/2004 | Pelrine et al. | |
| 7,108,316 B2 | 9/2006 | Barvosa-Carter et al. | |
| 7,293,836 B2 | 11/2007 | Barvosa-Carter et al. | |
| 2006/0033312 A1 | 2/2006 | Barvosa-Carter et al. | |
| 2007/0025575 A1 | 2/2007 | Oser et al. | |
| 2007/0063566 A1 | 3/2007 | Browne et al. | |
| 2007/0188004 A1 | 8/2007 | Browne et al. | |
| 2007/0246285 A1 * | 10/2007 | Browne et al. | .............. 180/273 |
| 2007/0246979 A1 | 10/2007 | Browne et al. | |
| 2009/0030576 A1 * | 1/2009 | Periot et al. | ................... 701/45 |

* cited by examiner

*Primary Examiner*—Kim T Nguyen
(74) *Attorney, Agent, or Firm*—Dinsmore & Shohl LLP

(57) ABSTRACT

Seat assemblies for a vehicles include seat panels in communication with a controller and having a fiber optic sensing device that measures pressure exerted at various locations of the seat panels and cushioning materials comprising active materials, wherein upon receipt of pressure signals by the controller from the sensing device, the controller generates activation signals that adapt physical characteristics of the active materials.

18 Claims, 3 Drawing Sheets

SEAT ASSEMBLIES FOR VEHICLES

TECHNICAL FIELD

The present invention generally relates to seat assemblies. More particularly, the present invention relates to adjustable seat assemblies for vehicles, the seat assemblies having position measuring devices and materials that can be adjusted pursuant to signals from the position measuring devices.

BACKGROUND

Currently, vehicle seat assemblies are static with respect to stiffness, rebound, etc. As such, the comfort provided to heavier persons vs. lighter persons can vary. In addition, while some current seat assemblies provide functionality to manually adjust the panels of the seat assemblies and/or the lumbar support, seat assemblies do not provide functionality to tune the panels, or particularly, cushions of the seat assembly pursuant to physical characteristics of the passenger, so that comfort level can be optimized.

Accordingly, improved vehicle seat assemblies are desired.

SUMMARY

According to one embodiment, a seat assembly for a vehicle includes a first panel, a sensing device having a fiber optic sensor that measures pressure exerted on the first panel, wherein the fiber optic sensor generates pressure signals in response to the measured pressure and a controller in communication with the sensing device having preprogrammed comfort profiles corresponding to varying pressures exerted on the first panel, wherein upon receipt of the pressure signals by the controller from the sensing device, a comfort profile corresponding to the pressure signals is determined.

According to another embodiment, a seat assembly for a vehicle includes a first panel in communication with a controller, the first panel having a sensing device that measures pressure exerted on the first panel, wherein the sensing device generates pressure signals in response to the measured pressure and a cushioning material comprising an active material, wherein upon receipt of the pressure signals by the controller from the sensing device, a comfort profile corresponding to the pressure signals is determined.

According to yet another embodiment a seat assembly for a vehicle includes a first panel in communication with a controller, the first panel having a fiber optic sensing device that measures pressure exerted at various locations of the first panel, wherein the sensing device generates pressure signals corresponding to a pressure profile in response to the measured pressure and a cushioning material comprising an active material, wherein upon receipt of the pressure signals by the controller from the sensing device, the controller generates activation signals that adapt a physical characteristic of the active material.

These and additional features can be more fully understood in view of the following detailed description, in conjunction with the drawings.

BRIEF DESCRIPTION OF THE DRAWINGS

The embodiments set forth in the drawings are illustrative and exemplary in nature and not intended to be limited of the inventions defined by the claims. Moreover, the individual features of the drawings will be more fully apparent and understood in view of the detailed description. The following detailed description of specific embodiments of the present invention can be best understood when read in conjunction with the following drawings, where like structure is indicated with like reference numerals and in which:

DETAILED DESCRIPTION

As described herein, seat assemblies for vehicles generally comprise one or more seat panels which are adjustable according to measurements from one or more sensing devices corresponding to the position and/or weight (e.g., physical characteristics) of a passenger. In one embodiment, the seat panels may comprise one or more active materials and respond to measurements from sensing devices such as optical fibers embedded within one or more of the seat panels of the seat assemblies. Each of these components will be described more fully below.

Figure 1:
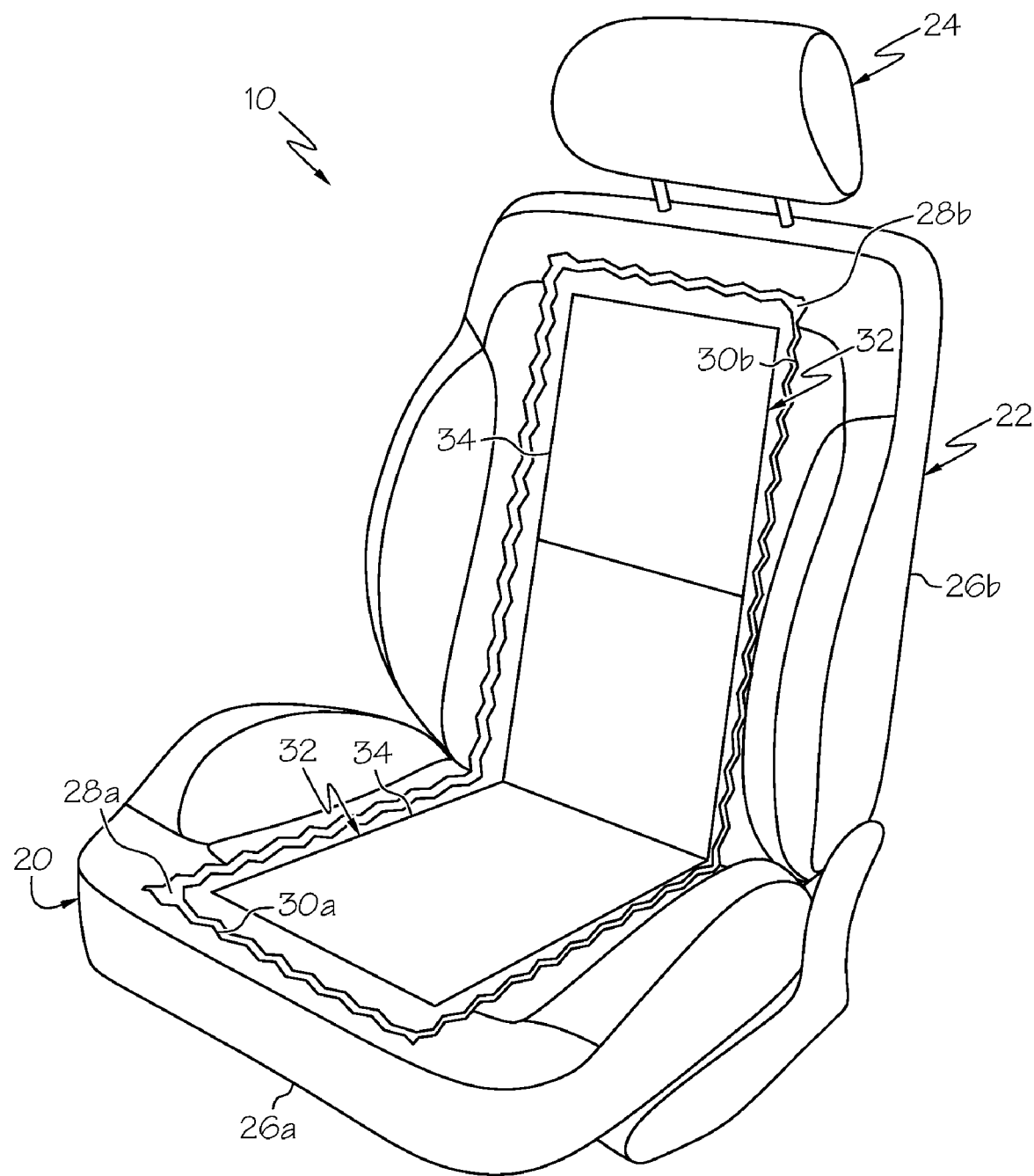
FIG. 1 is a schematic perspective view of a seat assembly in accordance with one exemplary embodiment.

Referring to FIG. 1, an exemplary vehicle seat assembly 10 is illustrated. As illustrated, vehicle seat assembly 10 may comprise a first or horizontal seat panel 20, a second or vertical seat panel 22, and optionally a headrest 24. In another embodiment, seat assembly 10 may comprise any number of seat panels. As illustrated, seat panels 20 and 22 may generally comprise a base 26a and 26b (collectively, 26), cushioning material 28a and 28b (collectively, 28), cover material 30a and 30b (collectively, 30) and a sensing device 32.

Base 26 may include plastic (molded or otherwise), wood or any other material configured to secure and maintain the components of the seat panel and/or the seat panel components to a frame (not shown) and is generally illustrated as the back, bottom (or general interior such as 26a) of the seat assembly 10. Cover material 30 may include leather, leatherette, fabric or any other material generally used as a cover material for vehicle seats. Of course, any base, cover material and framing portions for seat assembly may be utilized.

Sensing device 32 may include one or more position sensors, pressure sensors, displacement sensors, PZT films, conductive polymers or combinations thereof. In one embodiment, such as that shown in FIG. 1, sensing device may include one or more optical fiber sensors 34. Such optical fiber sensors 34 may include a coiled optical fiber embedded in a flexible tubular or cylindrical carrier body such that deformation of the carrier body will cause variation of the curvature and shape of the coiled optical fiber. This deformation initiates variation of light transmission losses in optical signals transmitted from one end of the coiled fiber (or components thereof) towards another end of the coiled fiber. Such optical fiber sensors may be configured to detect an average pressure exerted on the carrier body (e.g., one or more panels of the seat assembly). In another embodiment, optical fiber sensors may be Distributed Pressure Sensors (DPS) which detect the pressure exerted at different positions along the length of the carrier body (e.g., one or more panels of the seat assembly) and map pressure variations along the length of the carrier body (e.g., Fiber Bragg grating systems). Where Fiber Bragg gratings (FBG) are used, such can provide fixed sensor sections in an optical fiber, so that pressure and/or other measurements can be performed in pre-selected portions of the fiber, which are subsequently positioned at pre-selected locations where the measurements are to be made.

Of course, it should be understood that any optical fiber sensor or system configured to measure position/pressure or other characteristics may be used with the seat assemblies contemplated herein. For example, in another embodiment, sensing device 32 may include any other pressure or displacement sensors such as strain gauges (i.e., electrical pressure sensors), etc. When optical fiber sensors or systems are used as the pressure or displacement sensors, the systems can further include a laser diode, a drive control circuit (containing a power source circuit) for driving the laser diode and a controller positioned within the seat assembly or elsewhere within the vehicle and in communication with the seat assembly.

Sensing device 32 may be located at and along any location of the seat assembly 10 (e.g., laterally, longitudinally and/or diagonally). For example, as illustrated in FIG. 1, sensing device 32 (e.g., optical fibers 34) is located in both the first and second seat panels 20, 22 around the perimeters of the panels as well as transversely across about the center of the second panel 22. Of course, it should be understood that any combination of sensing devices at any locations along any one or more of the panels can be utilized. In addition, as illustrated, sensing device may be embedded within cushioning material and/or above or below cushioning material within one or more panels of the seat assembly.

Sensing device 32 may be utilized to measure the pressure exerted by a passenger (or the general position of a passenger) seated in the seat assembly 10. For example, sensing device 32 is able to measure pressure exerted at various locations about the seat assembly 10, such as on the first and second panels 20, 22 (or, in another embodiment, the headrest). The measured pressure can be relayed as a pressure signal or pressure signals to a controller device associated with the seat assembly 10, or otherwise within the vehicle. For example, pressure signals indicative of a measured body size of an individual (e.g., weight, width or height) can be sent to the controller or computer for processing. It is contemplated that sensing device will be implemented so that pressure/position can be measured at various locations about the seat assembly. As discussed below, seat assembly characteristics can be adapted according to these measurements.

In another embodiment, pressure measurements may be used for quality testing of vehicle seat assemblies. For example, when testing the durability of seat assemblies at an assembly plant, such sensing devices can be embedded within the seat assemblies to determine usual positions of pressure so that materials in such regions can be strengthened when necessary.

As discussed, seat assemblies 10 may include or be associated with a controller. Such a controller may have programmed data corresponding to general characteristics of the seat assembly such as stiffness, rebound, position, etc. Particularly, controller may include data relating to a set or preferred seat assembly stiffness, rebound, position or other characteristic (i.e., a comfort profile) that corresponds to the pressure measurements taken and signals relayed by the sensing device (i.e., a pressure profile). For example, if the sensing device measures a light pressure on portions of the first panel 20 and pressure partially along the length (or along the transverse) of second panel 22, signals relating to a pressure profile (e.g., the total pressure exerted on the seat) may be sent to the controller. The controller may recognize such signals and pressure profile as indicating a smaller passenger (e.g., a child) and determine an appropriate comfort profile. Thereafter, such a comfort profile may be manually or automatically implemented so as to adapt (i.e., mechanically move or reshape) seat panels 20 or 22, or seat assembly 10, according to the determined comfort profile that would match such a pressure profile, as discussed later herein.

As previously stated, seat assemblies 10 may also include cushioning material 28. In one embodiment, cushioning material may comprise a passive material such as polyurethane foam or other conventional material generally used to construct vehicle seats. In such an embodiment, upon receiving the pressure signals from the sensing device relating to a pressure profile, controller may match the pressure profile with a corresponding predetermined comfort profile and generate signals to adjust the position of one or more of the seat panels 20, 22 to match the comfort profile. Continuing with the example above, if the pressure signals/profile indicates a smaller passenger, the associated comfort profile may include a seat assembly position with a higher horizontal or first panel 20. Accordingly, in such an example the controller would generate signals to the seat assembly (e.g., to the motors controlling height of the first panel 20) to raise horizontal or first panel 20 to a predetermined level as set in the comfort profile.

In another embodiment, cushioning material 28 may comprise an active material. The term active material generally refers to a material that exhibits a change in a property such as dimension, shape, phase, orientation, stiffness, and the like upon application of an activation signal. Active materials may include electroactive polymers (EAP), shape memory alloys (SMA), ferromagnetic shape memory alloys (MSMA), shape memory polymers (SMP), piezoelectric materials, magnetorheological (MR) elastomers, electrorheological (ER) elastomers, ER fluids and MR fluids and combinations thereof to name a few. Depending on the particular active material, the activation signal can be an electric current, an electric field (voltage), a temperature change, a magnetic field, a mechanical loading or stressing and combinations thereof to name a few.

Figure 2:
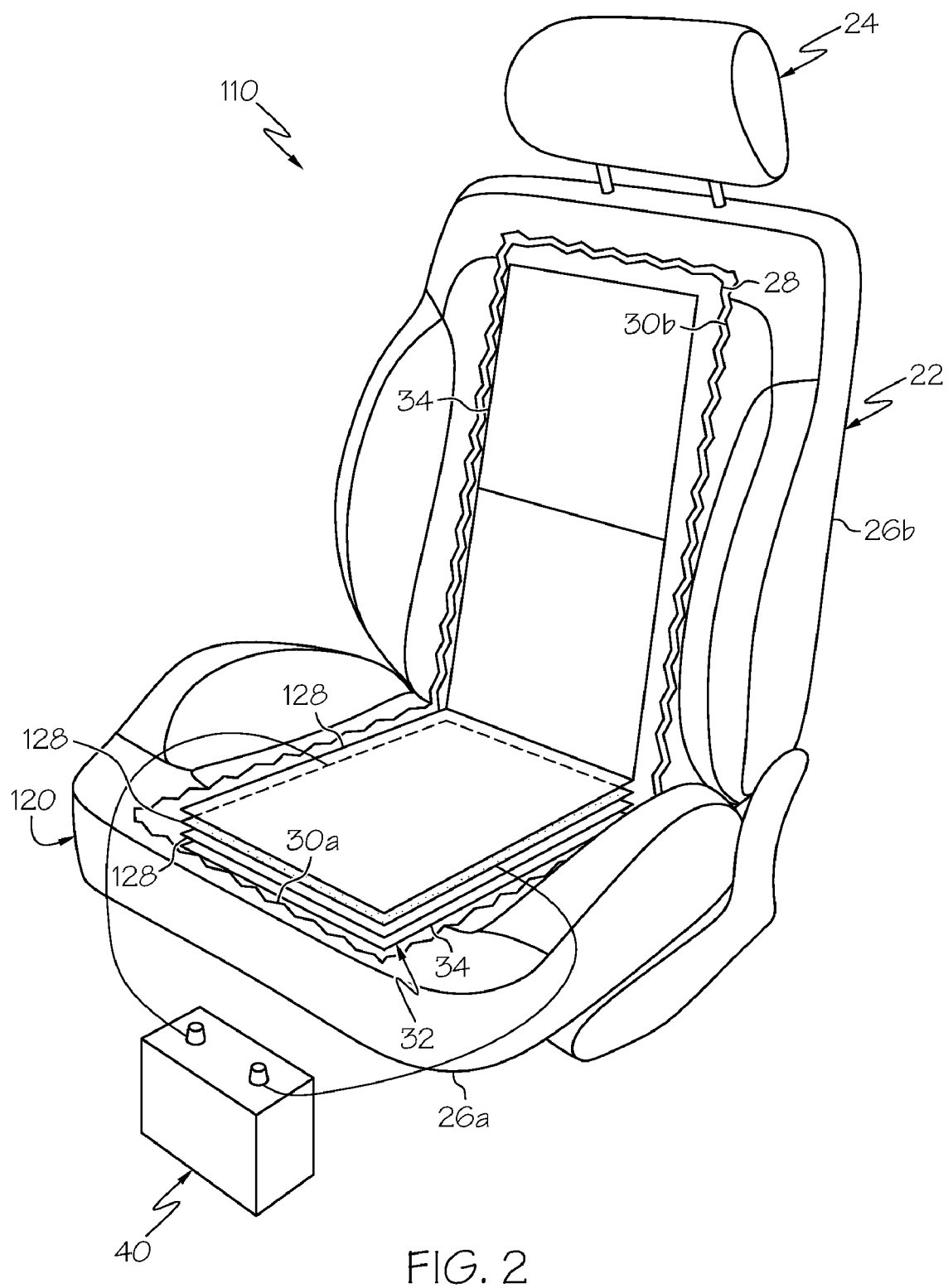
FIG. 2 is a schematic perspective view of a seat assembly in accordance with an alternative exemplary embodiment.

In one embodiment, such as that illustrated in FIG. 2, cushioning material 128 (e.g., illustrated with respect to the first panel 120) comprises electroactive polymer (EAP) active materials. Electronic electroactive polymers (EAPs) generally comprise a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. Materials suitable for use as an electroactive polymer may include silicone elastomers, acrylic elastomers, polyurethanes, thermoplastic elastomers, copolymers comprising PVDF, pressure-sensitive adhesives, fluoroelastomers, polymers comprising silicone and acrylic moieties.

Still referring to FIG. 2, wherein cushioning material 128 comprises an active material, seat assembly 110 can be configured for reshaping and/or changing the modulus of the seat assembly or one or more seat panels 120, 22 as specified by the comfort profile, which can be implemented manually or automatically in response to the pressure profile measured by the sensing device. Particularly, upon receipt of the pressure signals/profile and determination of the appropriate comfort profile, the controller may determine an appropriate comfort profile and automatically output activation signals to the active materials such as to implement the desired comfort profile. In another embodiment, activation signals may be generated by a controller upon manual commands by a passenger, such as through manual selection of a comfort profile or selectively changing portions of the seat panels. As such, activation signals can be applied to the active material either automatically in response to a signal from the controller based on processing of sensor inputs (e.g., the pressure profile) and/or occupant requests such as through manual controls or predetermined comfort profiles.

Upon receipt of an activation signal, the active material undergoes a change in at least one physical property or characteristic, which can be effective to change at least one feature of the seat assembly such the shape, stiffness, configuration, geometry, compliance, and combinations thereof of the active material based seat assembly. If desired, different regions of the seat assembly having active materials could be activated to meet the selected comfort profile.

Figure 3:
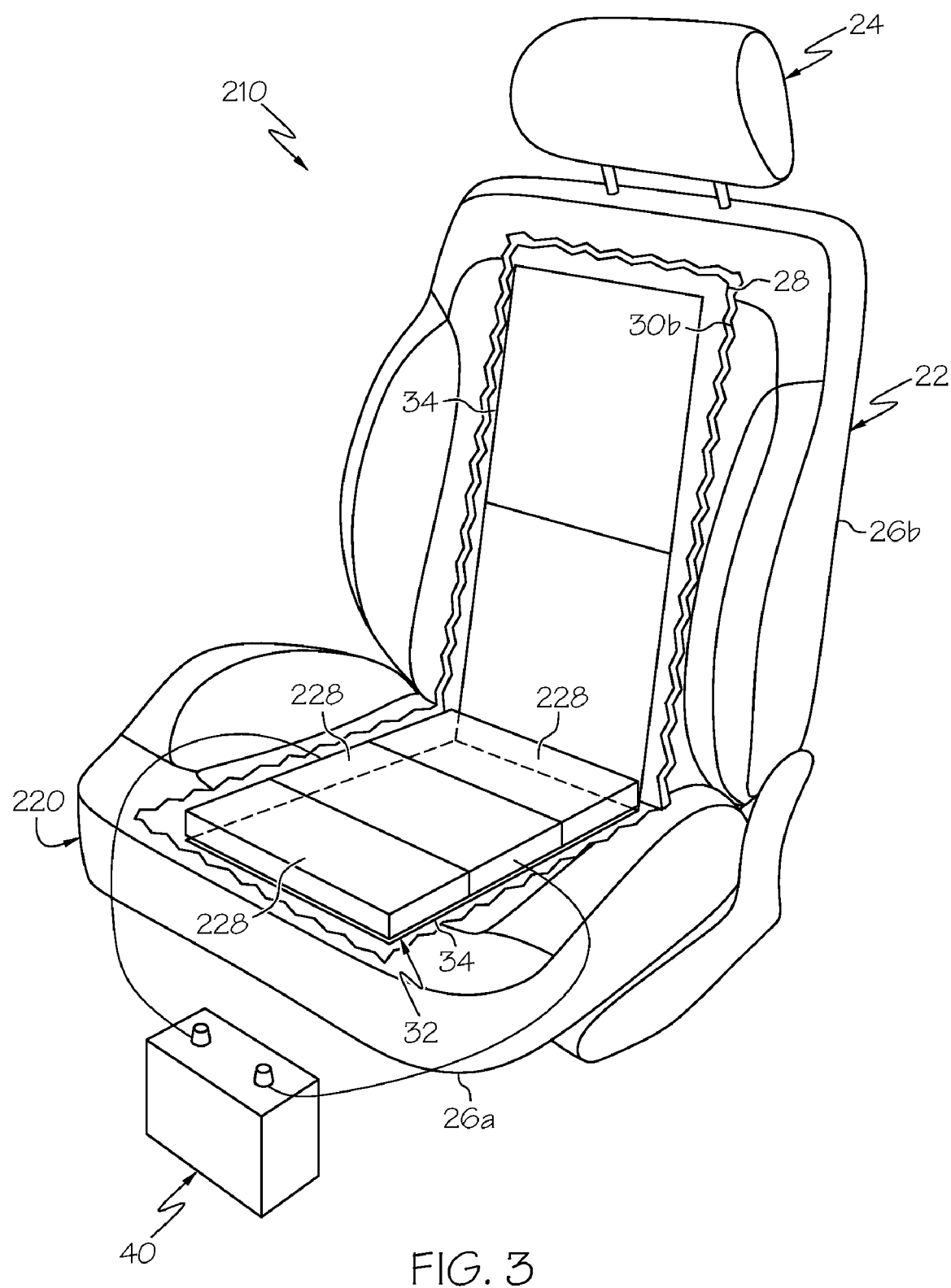
FIG. 3 is a schematic perspective view of a seat assembly in accordance with an alternative exemplary embodiment.

Referring to FIGS. 2-3, active materials can be arranged in series (FIG. 2) or parallel (FIG. 3). It should be understood that while FIGS. 2-3 illustrate active materials in first panel only, active materials may be included in one or more panels of the seat assembly. For example, referring to FIG. 2, cushioning material 128 may comprise electronic electroactive polymers (EAPs) arranged in series and connected to a power source 40. Particularly, upon receiving pressure signals relating to a pressure profile from sensing device and matching a predetermined comfort profile (or a manual input comfort profile), controller may send activation signals to the EAPs (i.e., to power source, which will then charge electrodes embedded within EAP) to change the dimension, shape, phase, orientation, stiffness of the EAPs, and ultimately, the panel 120 of seat assembly 110. It is contemplated that arrangement of EAPs in series such as illustrated in FIG. 2 allows for tuning control of stiffness of the panel and seat assembly.

Referring to FIG. 3, cushioning material 228 may also comprise electronic electroactive polymers (EAPs) arranged in parallel and connected to a power source 40. Particularly, upon receiving pressure signals relating to a pressure profile from sensing device and matching a predetermined comfort profile (or a manual input comfort profile), controller may send activation signals to the EAPs (i.e., to power source, which will then charge electrodes embedded within EAP) to change the dimension, shape, phase, orientation, stiffness of the EAPs, and ultimately, the panel 220 of seat assembly 210. It is contemplated that arrangement of EAPs in parallel such as illustrated in FIG. 3 allows for localized tuning control (e.g., from front to back) of the panel and seat assembly. In another embodiment, EAPs arranged in series and parallel may be utilized in the same or different panels.

Accordingly, seat assemblies for vehicles described herein may be adaptable according to measurements taken by sensing devices. Depending on the pressure signals relating to a pressure profile, a predetermined comfort profile may be selected and implemented to provide a tunable assembly for varying sized passengers.

The foregoing description of the various embodiments and principles of the inventions has been presented for the purpose of illustration and description. It is not intended to be exhaustive or to limit the invention to the precise forms disclosed. Many alternatives, modifications and variations will be apparent to those skilled in the art. Moreover, although many inventive aspects have been presented, such aspects need not be utilized in combination, and various combinations of inventive aspects are possible in light of the various embodiments provided above. Accordingly, the above description is intended to embrace all possible alternatives, modifications, combinations and variations that have been discussed or suggested herein, as well as others that fall within the principles, spirit, and broad scope of the various inventions as defined by the claims.

What is claimed is:

1. A seat assembly for a vehicle comprising:
  a first panel;
  a cushioning material on the first panel comprising an active material;
  a sensing device having a fiber optic sensor that measures pressure exerted at the first panel, wherein the fiber optic sensor is located along the cushioning material such that the fiber optic sensor generates pressure signals in response to the measured pressure; and
  a controller in communication with the sensing device having preprogrammed comfort profiles corresponding to varying pressures exerted on the first panel, wherein upon receipt of the pressure signals by the controller from the sensing device, a comfort profile corresponding to the pressure signals is determined.

2. The seat assembly of claim 1 wherein upon receipt of the pressure signals by the controller from the sensing device, the controller generates activation signals that adapt a physical characteristic of the active material.

3. The seat assembly of claim 1 wherein the active material is arranged in parallel.

4. The seat assembly of claim 1 wherein the active material comprises electroactive polymers.

5. The seat assembly of claim 1 further comprising a second panel having a fiber optic sensor that measures pressure exerted on the second panel.

6. The seat assembly of claim 1 wherein the pressure signals correspond to a pressure profile, wherein upon receipt of the pressure signals by the controller from the sensing device, a comfort profile corresponding to the pressure profile is automatically implemented.

7. A seat assembly for a vehicle comprising:
  a first panel in communication with a controller, the first panel having a sensing device comprising a fiber optic sensor that measures pressure exerted at the first panel, wherein the sensing device generates pressure signals in response to the measured pressure;
  a cushioning material on the first panel comprising an active material, wherein upon receipt of the pressure signals by the controller from the sensing device, a comfort profile corresponding to the pressure signals is determined; and
  a cover material, the fiber optic sensor extending along the cushioning material, the fiber optic sensor and the cushioning material being at least partially covered by the cover material, the fiber optic sensor located in a space between a front, rear and sides of the first panel to measure pressure exerted at the first panel.

8. The seat assembly of claim 7 wherein the controller comprises preprogrammed comfort profiles corresponding to varying positions of the first panel.

9. The seat assembly of claim 7 wherein upon receipt of the pressure signals by the controller from the sensing device, a comfort profile corresponding to the pressure signals is implemented.

10. The seat assembly of claim 9, wherein upon receipt of the pressure signals by the controller from the sensing device, the controller generates activation signals corresponding to a comfort profile to adapt the active material.

11. The seat assembly of claim 7 wherein the active material is arranged in parallel.

12. The seat assembly of claim 7 wherein the active material is arranged in series.

13. A seat assembly for a vehicle comprising:
  a first panel in communication with a controller, the first panel having a fiber optic sensing device that measures pressure exerted at various locations of the first panel, wherein the sensing device generates pressure signals corresponding to a pressure profile in response to the measured pressure; and a cushioning material on the first panel comprising an active material, wherein upon receipt of the pressure signals by the controller from the sensing device, the controller generates activation signals that adapt a physical characteristic of the active material;

wherein the fiber optic sensing device comprises a fiber optic sensor located along the cushioning material such that a change in the physical characteristic of the active material changes pressure signals generated by the sensing device.

14. The seat assembly of claim 13 wherein the controller comprises preprogrammed comfort profiles corresponding to varying positions of the first panel.

15. The seat assembly of claim 14 wherein upon receipt of the pressure profile by the controller from the sensing device, a comfort profile corresponding to the pressure profile is determined.

16. The seat assembly of claim 13 wherein the active material is arranged in parallel.

17. The seat assembly of claim 13 wherein the active material is arranged in series.

18. The seat assembly of claim 13 wherein the active material comprises electroactive polymers.

* * * * *